United States Patent [19]

Eschner et al.

[11] Patent Number: 5,719,500
[45] Date of Patent: Feb. 17, 1998

[54] PROCESS FOR DETECTING METALLIC ITEMS INCLUDING A SEARCH PATH DEFINED BY A LINEAR MOVEMENT WITH A SUPERIMPOSED ROTATIONAL MOVEMENT ALONG A CURVED CLOSED PATH

[75] Inventors: Wolfgang Eschner; Ralph Koch, both of Friedrichshafen; Jürgen Kramer, Uhldingen-Mühlhofen; Bernhard Neumeyer, Immenstaad; Rainer Ulbrich, Oberteuringen; Hanns-Peter Trinkaus; Klaus Ausläder, both of Reutlingen, all of Germany

[73] Assignee: Dornier GmbH, Germany

[21] Appl. No.: 611,659

[22] Filed: Mar. 6, 1996

Related U.S. Application Data

[63] Continuation of PCT/DE95/00858, Jul. 6, 1995.

[30] Foreign Application Priority Data

Jul. 6, 1994 [DE] Germany ............... 44 23 623.9

[51] Int. Cl.$^6$ ........................... G01V 3/11
[52] U.S. Cl. ........................... 324/329
[58] Field of Search ........................... 324/326–329, 324/66, 67, 228, 229, 234, 239, 243

[56] References Cited

U.S. PATENT DOCUMENTS

| | | |
|---|---|---|
| 3,875,497 | 4/1975 | Madsen . |
| 4,021,725 | 5/1977 | Kirkland . |
| 4,727,329 | 2/1988 | Behr . |
| 4,924,450 | 5/1990 | Brashear et al. ............ 324/329 X |
| 4,926,127 | 5/1990 | Auslander et al. ............ 324/329 |
| 5,452,639 | 9/1995 | Aulenbacher et al. ............ 89/1.13 |
| 5,506,506 | 4/1996 | Candy ............ 324/329 |

FOREIGN PATENT DOCUMENTS

| | | |
|---|---|---|
| 0 249 110 | 12/1987 | European Pat. Off. . |
| 2 273 572 | 6/1994 | United Kingdom . |

*Primary Examiner*—Sandra L. O'Shea
*Assistant Examiner*—Roger Phillips
*Attorney, Agent, or Firm*—Evenson, McKeown, Edwards & Lenahan, P.L.L.C.

[57] ABSTRACT

A process for detecting metallic or other electrically conducting objects in essentially flat search areas by means of at least one search probe which generates search signals is presented. The probe is guided relative to the search area parallel to its surface, along a search path situated in a search surface. By at least one analysis unit coupled with the search probe, the search signals are automatically correlated with the positions of the search probe on the search surface, as determined by localizing devices. The correlated data are converted to an image of the objects in the search area, such as an object map.

34 Claims, 3 Drawing Sheets

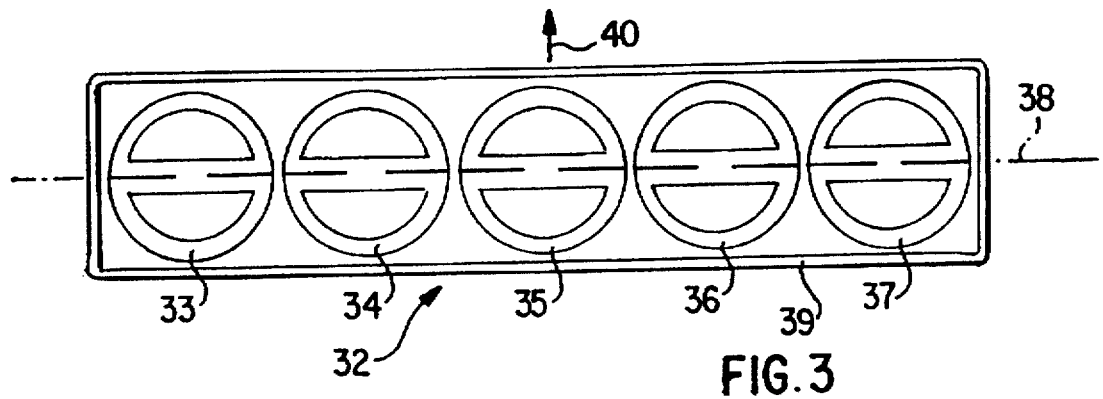
FIG. 3
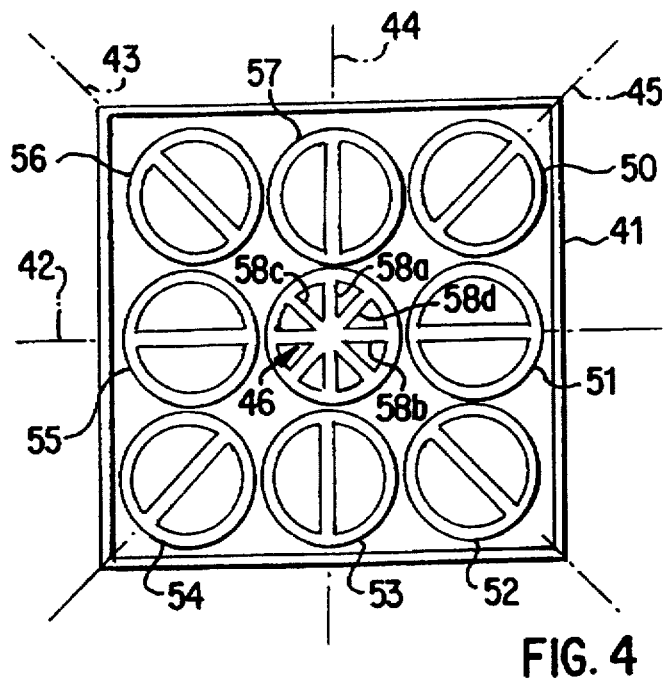
FIG. 4
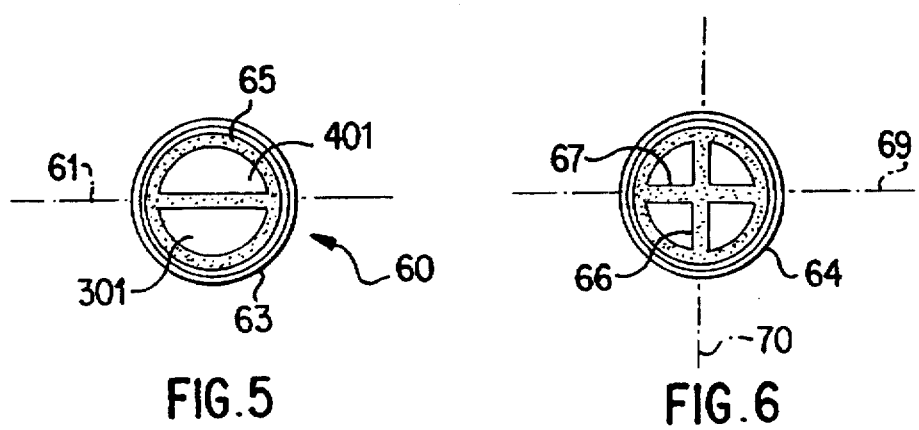
FIG. 5
FIG. 6

PROCESS FOR DETECTING METALLIC ITEMS INCLUDING A SEARCH PATH DEFINED BY A LINEAR MOVEMENT WITH A SUPERIMPOSED ROTATIONAL MOVEMENT ALONG A CURVED CLOSED PATH

BACKGROUND AND SUMMARY OF THE INVENTION

This is a continuation of international application Serial No. PCT/DE95/00858 filed Jul. 6, 1995. The invention relates to a process and apparatus for detecting electrically conducting objects, particularly metallic objects such as metallic debris in a large search area.

As a result of industrialization, military confrontations or other events which stress the soil, the area of the ground close to the surface in many regions of the world is partially, and in many cases extensively contaminated with foreign bodies. Thus, for example, large areas of the world are contaminated by land mines and are virtually unusable. These mines represent a permanent danger to the lives of thousands of people. Less spectacular but hardly less dangerous is the contamination of military training areas by fragments and projectiles of any type. With respect to any national economy, the detection and subsequent clearing of such old debris is extremely important in the long run.

To detect electrically conducting, especially metallic, waste items which cannot be detected directly by people because they are situated, for example, in the ground or are surrounded by other materials of a different or lower electric conductivity, inductive detectors which operate according to the eddy current principle are commonly used. In these detectors, an alternating electromagnetic field is generated by a transmitting coil excited by alternating voltage. The alternating electromagnetic field induces eddy currents in electrically conducting materials within its range, which in turn generate alternating electromagnetic fields. The induced alternating electromagnetic fields generate voltages in a receiver coil, which characteristically depend on the relative position between the detector and the object to be detected, and on the type of the object to be detected. The electric signals may appropriately be converted into signals which can be detected by humans beings.

Known detectors of this type may be moved manually at a close distance over an area to be searched, particularly by means of sweeping movements. The receiver coil arrangement has left and right halves which are separated by a neutral separating plane. When close to an object to be detected, each coil generates a different acoustic signal. When an operator sweeps the detector approximately perpendicularly to the separating plane he or she first hears, for example, a high pitched sound when the object to be detected is situated below the left probe half; then an ebbing of the sound to zero when the object is situated approximately symmetrically with respect to the separating plane; and finally an increasing of a deep sound which indicates that the object is situated predominantly below the right half of the probe. Thus, by sweeping the detector in one direction, the lateral position of the object can be determined precisely, and by sweeping over the same area in a direction which is, for example, perpendicular to the first direction, it is possible to locate precisely the object to be detected, which may then be marked.

By continuously sweeping the detector while moving, for example, along previously defined lines, large surfaces may be searched and the position of the objects to be detected may be marked. The process requires well trained probe operators who, as a result of their training and experience, can derive information concerning the objects to be detected from the course of the search signals. Thus, the search results depend considerably on the skill of the probe operator. The searching of larger areas is highly personnel and time intensive.

The search for magnetizable (particularly ferromagnetic) materials by means of magnetic field probes is also known. Magnetizable materials may be magnetized by the earth's magnetic field and will then act like weak magnetic dipoles. Using magnetic field probes, the size and the alignment of the dipoles can be determined. An elongated object extending, for example, approximately parallel to the surface has a different "signature" than an approximately punctiform object or an elongated object which extends perpendicularly to the surface. In the former case, the magnetic probe "sees" the field of both poles, while in the second case, it sees only one pole. By means of magnetic field probes, larger surfaces can be searched continuously. Measured values can be recorded preferably point-by-point (for example, in 10 cm grids), and the point information of the individual grid points can subsequently be combined to form a total image of the objects to be detected in the search area. Due to the bipolar effect of the objects to be detected, the analysis can be carried out in particular with respect to the alignment of the objects to be detected. Several magnetic field probes have also been used in a "comb-type" arrangement, in which case several grid points situated next to one another can be measured simultaneously. As in the eddy current process, the success of the search depends considerably on the operators skill and is very time-consuming.

It is an object of the invention to provide a process and apparatus for detecting debris which is scattered in large surface areas, rapidly and reliably, with a result that can be treated objectively, while the personnel expenditures are low.

This object is achieved by the process and apparatus according to the invention, in which at least one search probe generating search signals is guided in the search area, preferably essentially parallel to its surface, along a search path situated in a search surface. An analysis unit connected with the search probe, and to which the signals are transmitted, automatically associates the search signals with positions of the searching probe on the search surface, so that such positions may be determined by automatic localizing devices. The search signals assigned to the search surface positions may be converted to an image of the objects in the search area.

In this case, the term "image" is not limited to a visually perceivable recording. An image in this sense may also be obtained by conversion of the search signals assigned to the positions, to signals which can be stored in a storage medium. That is, the whole search result may be imaged as a data set in a magnetically or optically operating storage medium (optical data memory, magnetic tape, magnetic disk). This image may simultaneously or subsequently be converted to other image forms (for example, by means of a printer or the like), into map-type images, as an outline on a video screen or as a list of local coordinates with the pertaining coded search information. In addition to yes/no reports concerning locations at which a search signal has occurred, information can also be extracted from the search signals (by means of suitable analysis devices), concerning the form, size, alignment (inclination, declination), depth and material type. These data may also be imaged and utilized for the identification of the objects to be detected. This can permit a use of efficient clearing devices adapted to the type of objects to be detected.

Although it is preferable for the search surface to be largely planar, it is possible to move the search probe along curved search surfaces. The search probe can move along the search surface in an area which is contiguous as far as the surface is concerned; preferably continuously, so that it is guided over each site of the search surface at least once. Search path sections may preferably adjoin one another at least in sections and/or may overlap one another at least partially. Ideally, the probe can move over each site of the search surface several times, thereby improving the probability of a detection. Movement of the probe over each site several times in different directions is particularly advantageous in the case of search probes with a direction-dependent sensitivity, such as for example, a probe with several search sectors separated by possibly neutral separating planes. Even if the search probe is moved with the neutral separating plane along the object to be detected, and thus generates no search signal in one direction, it may generate a search signal in a different direction. Thus, if for each location of the search surface, search signal sequences are recorded for different movement directions of the search probe, in addition, search probe signals can be better assigned to the search objects and, in particular, information can be obtained concerning their size and lateral alignment.

The process according to the invention can be implemented by means of conventional "probe operators", in which case the search signals may be combined with position signals and processed to form images of the objects. Assignment of the search signals to respective locations on the search surface (or, when the relative position of the search area and the search surface is known, in the search area) can be implemented particularly simply if the search probe is guided systematically according to a reproducible pattern. Advantageously, the search probe can be moved along a search path which is obtained by superimposing first and second linear movements (preferably along a straight line) at least in sections. Preferably, the second movement extends at a right angle relative to the first movement.

By means of a second movement which is essentially perpendicular to the first, with suitable coordination between the possibly varying speed of the first movement and that of the second movement as well as the width of the search path which can be probed by the search probe, it is possible to arrange the search pattern so that a total search path can be searched along the first movement line which has a width substantially equal to the length of the second linear movement. Moreover, surface defining movement of the search probe can be generated. Adjacent search path sections may extend essentially in parallel to one another, and preferably at least adjoin one another, and may also be superimposed in sections. In this manner, the search path may then extend along a winding or curving course, with straight search path sections. A zig-zag-shaped overall movement is also possible. Moving speeds of the search probe along the search path may be in the range of several m/s, preferably at approximately 1 to 2 m/s.

The search probe may also be guided along a search path which includes a first movement along a straight line (or at least in straight sections), with a second movement which is circular or circular-arc-shaped superimposed thereon. The second movement in this case is a rotating movement which can be implemented in a particularly simple and sturdy manner. In the case of a complete rotation (a circular second movement), this type of movement is sometimes referred to as utilizing a "lawn mower principle"; the circular-arc-shaped second movement would then correspond to a "scythe principle".

By the use of one or more search probe(s) according to the lawn mower principle, paths having a width approximately equal to the diameter of the circular movement can be searched along a first linear movement. With a corresponding coordination between the engine speed of the first movement and the rotational speed of the second movement, the probe is moved several times over all search locations in different directions (with the exception of the extreme left and right edge areas of the overall search path), mostly with a different orientation of the search probe, and thus with a different alignment of possible existing areas of minimal sensitivity (separating plane) of the search probe.

Other combinations of first, second and possibly additional movements of the search probe are also possible in order to completely cover a search surface, possibly sensing each site several times, preferably in different directions. For example, the search probe can be guided along search paths which superimpose two circular movements and possibly a linear movement. Moreover, the circular movements may, have different radii. A third circular movement may also be superimposed on a movement composed of two linear movements. Search probes may be rotated about an axis which is perpendicular to the probe surface.

Advantageously, the search probe is an eddy current probe which can be excited by multiple frequencies. It may of course operate in a punctiform manner. Ideally, however, it may be a surface-type eddy current probe, with signal analysis that varies over a probe surface, particularly in sectors. Preferably, the eddy current probe may have two lobes arranged symmetrically with respect to one another and separated by a neutral separating plane, thus providing the search probe with a pseudo-dipole characteristic. Signal analysis which varies by sectors allows at least a linear position determination of the search probe relative to the object to be detected (in the case of more than two sectors possibly also a point-precise position determination), or a corresponding determination of the position of the object to be detected relative to the search probe.

The use of multiple exciter frequencies in the eddy current probe achieves a number of advantages because different materials have differing characteristic effects on the impedance of the receiver coils of the eddy current probe due to their material characteristics, such as the electric conductivity, the permeability, etc. Receiver coil impedance can be represented as a vector (in a so-called impedance diagram in a complex impedance plane), which reflects the real ohmic resistance and the imaginary, reactive impedance. For a particular material, such impedance changes in a characteristic manner as a function of frequency. If, for example, two frequencies are considered (2 kHz and 20 kHz are preferred), two vectors, corresponding to these frequencies may be assigned to each material in the impedance plane. These vectors may be considered with respect to their real part and/or imaginary part and may be used for obtaining information.

For example, the reactive impedance (imaginary part) in the case of a magnetic soil or in the case of salt water or soil saturated with salt water, is essentially frequency-independent. This property may be used to discriminate a background signal attributable to one of these substances. The real and imaginary parts may, for example, be converted to corresponding voltages and displayed on an oscilloscope or the like.

In contrast to the magnetic soil and the salt water, metals result in different contributions to the reactive impedance at different frequencies. Thus, if only the difference of the reactive impedances is analyzed (in the case of two different exciter frequencies), the background information is automatically eliminated, and only the information concerning the materials to be detected will remain. This information is present as an absolute value of the difference of the inductive reactive impedances (delta µ), the position of delta-µ on the axis of the inductive reactive impedance also being dependent on the material. By analyzing "windows" (that is, value ranges) on the imaginary axis, this delta-µ process can be used, for example, to suppress ground and/or to identify the objects to be detected according to their type of material (for example, aluminum, stainless steel, iron). Windows may naturally also be set for analysis of the ohmic resistance.

Pulse operation is also possible in which, for example, a rectangular exciter pulse corresponds to a plurality of frequencies to which different materials "respond" in different manners. Thus, for example, the frequency content of short pulses may be used to discriminate between a poorly conducting material (wet soil; for example, in the proximity of a shore, salt water) and an electrically highly conductive material such as metal.

Advantageously, the search probe may also be a magnetic field probe which detects changes of the earth's magnetic field caused by the effect of the earth's magnetic field on magnetizable (especially ferromagnetic) objects. Such magnetic field probes are known per se. They operate as passive probes which utilize the earth's magnetic field as an energy source affecting the objects to be detected, as described in the introduction. As a result of the effect of the objects to be detected as magnetic dipoles, by means of these search probes, information can also be obtained concerning the shape and alignment of objects. Objects which are situated deeper, during the search in a laterally farther expanded area of the surface, may cause different detectable distortions of the earth's magnetic field than identical objects which are situated close to the surface. Thus, by way of the "sharpness of the contours" of an object detected by means of a magnetic field probe, the depth of the object relative to the surface of the search area may be estimated. Analysis devices for magnetic field probes already exist which, as a result of the search signals with the dipole characteristic, permit a correct representation of position and characterize the dimensions, alignment and even the depth of the object to be detected.

The depth range of magnetic field probes typically extends to as much as approximately 6 m. In contrast, the search signals which can be obtained by means of eddy current probes originate essentially from an area close to the surface, and typically may extend to a depth of approximately 75 cm. The optimal effect may be at a few tens of centimeters—for example, approximately 30 cm. Typical laying depths of lands mines are within this stratum. Magnetic field probes respond to magnetizable objects to be detected, particularly to ferromagnetics, while electric conductivity is a prerequisite for the detectability by means of eddy current techniques. Advantageously, at least one eddy current probe and at least one magnetic field probe may preferably be guided simultaneously along the search surface. This makes it possible to combine the informational content of both processes, which supplement one another. In particular, a search of so-called flat areas close to the surface as well as areas which are deeper can be carried out in a single search operation.

It is expedient to combine the search signals of the eddy current probe and those of the magnetic field probe to form a common image. Since the search data obtained from these two different processes supplement one another, expediently it is possible to detect and characterize magnetizable as well as non-magnetizable but electrically conductive objects. Advantageously, analysis devices may be used which are optimized for magnetic field probes and which allow an analysis and representation of bipolar events. When eddy current probes are used which, because of their construction, also generate pseudo dipole signals, these may also be combined with the optimized analysis devices for a magnetic field probe which are known per se. While, during the search operation by means of a magnetic field probe, the object to be detected operates as a dipole itself, in the case of the eddy current probe with the pseudo dipole characteristic, the object to be detected must be considered as a quasi-punctiform source of an electromagnetic alternating field. In this case, the dipole characteristic of the search signal is generated by the special construction of the flat search probe which two search lobes. Among others, it is an advantage that, according to the process of the invention, known and proven analyzing hardware and software for magnetic field probes can be used. Thus combining the results of both processes in a common image is particularly attractive.

Various known devices can be used to determine the position of the search probe relative to the search surface or to the search area, either separately or combined with one another. These may be optical and/or mechanical and/or electromechanical and/or electromagnetic devices. For example, the position of the search probe relative to an arbitrarily determinable reference point in the search area can be determined by means of laser beams (laser tracking). It is also possible to construct the search probe as the course of an electromagnetic alternating field which is localized by a corresponding receiving apparatus. The localizing devices may also have at least one satellite based position generator. Localizing devices may also be used to determine the position of a platform on which the search probe is mounted, either rigidly or preferably movably, with additional sensors to determine its position relative to the platform. Directional counters, path measuring devices and angle measuring devices may be used for this purpose.

By combining the information of the search probes (search signals) and of the position sensing devices (position signals), the search signal can be correlated with the position in the search area. This information may be converted into a storable form and stored in a conventional computer memory. The information may also be converted to images of the objects in the search area, either essentially isochronously with the detection or in a time-staggered manner with respect to the actual detection operation. Advantageously, the objects, may be imaged on a temporary and/or permanent flat recording carrier which has a search surface corresponding to the search surface. Preferably, an object is represented by a colored object symbol, from which the position of the object in the search area and possibly its size, orientation, material or type of material, and depth can be recognized.

The recording carrier may, for example, be a video screen, or a map-type recording, and various aspects of the information can be analyzed. In addition, the information in the form of a stored data set can be processed using analyzing hardware and software. A process is preferred in which correlated pseudo dipole images are combined by arithmetic processing to form a single graphic symbol and are recorded on the recording carrier, which may also be called an object map. If a pseudo dipole is, for example, represented by a symbol in the shape of a figure "8", important information may be read from it concerning the scanning method as well as the detected object. First, the symbol "8" may indicate the presence of a metallic object to be detected. The graphic size of the "8" may characterize the dimension of the object to be detected. In the case of search probes with a pseudo dipole characteristic, the orientation of the "8" can indicate the general scanning direction which may extend perpendicularly to the separating plane between two probe sectors. The orientation of the "8" may also be rotated corresponding to recognizable direction structures in the dipole image according to the actual orientation of the object.

"Object maps" designed in such a manner can indicate all metal objects detected by the probe. If, for example, the material-selective technique of the "windows" described for the eddy current probe is applied to imaginary and/or real value ranges, for example, the presence of certain metal types or metal groups can be indicated by means of a special coloring of the "8" symbols. Thus, for example, all detected brass objects can be represented in a yellow color; all steel objects can be represented in blue and so on. This may be useful, for example, when, in a search area interspersed with steel fragments, dangerous ammunition parts with brass sleeves are present. Analysis of different aspects of detected search data makes it possible to optimally adapt any subsequent clearing of the detected objects to the type of the objects found. In addition to the surface performance of the imaging detection process, which is enormously increased by means of the process according to the invention in contrast to conventional processes, this again increases the efficiency and permits the effective use of personnel and material in a target-oriented manner which is optimally adapted to the respective task.

A system which is highly suitable for implementing the described process for detecting and identifying metallic objects in particular in an extended flat search area, may have at least one search probe which generates search signals. The probe may be arranged on at least one probe guiding device, and guided relative to the search area, preferably essentially parallel to its surface, along a search path situated thereon. Furthermore, sensors may be provided for determining the position of the search probe in the search surface, together with at least one analysis unit which communicates with the search probe. Finally, imaging devices may be provided for generating at least one image of the objects in the search area.

At least one first probe guiding device can be moved essentially parallel to the search surface in a first direction, and has at least one search probe arranged thereon. If the search probe is rigidly connected to this first probe guiding device, this probe guiding device may be suitably controlled so that the search probe is guided along the desired search path. Particularly for searching an area of the ground close to the surface, it is advantageous for the first probe guiding device to be a steerable vehicle (especially a land vehicle), which preferably can also be operated by remote control. The search probe may be mounted directly on the vehicle; but the vehicle may also pull or push a drivable apparatus, such as a trailer, with the search probe or several search probes. Vehicles may also follow a predetermined driving program after a designated surface has been searched according to a fixed pattern. The vehicle need not necessarily be manned, which is particularly expedient in the case of potentially dangerous search areas, such as mine fields.

On the first probe guiding device, such as a vehicle, there may be arranged one or more second probe guiding devices having at least one search probe which can be moved in a linear manner (particularly in a straight line), essentially in parallel to the search surface at a preferably right angle to the direction of movement of the first probe guiding device. The width of the search path of an individual search probe is determined by the diameter of the search probe. A search probe which, for example, can be moved back and forth in a straight line perpendicularly to the movement of the first probe guiding device, can scan an overall search path which corresponds to the dimension of the back and forth movement. With suitable coordination of the speed of the back and forth movement and the forward movement which extends perpendicularly thereto (possibly at a varying speed), a search area can be scanned without gaps. The probe may be moved back and forth, for example, on a rail which is arranged transversely, particularly at a right angle, with respect to the driving direction of a vehicle. Naturally, several search probes may also be moved back and forth, particularly simultaneously.

In a preferred embodiment of the invention, a second probe guiding device having at least one search probe is arranged on the first probe guiding device, and can be rotated about an axis, which is essentially perpendicular to the search surface. In this embodiment, which utilizes the above-described "lawn mower principle", one or more search probes can be arranged on a rigid rotation element, such as, for example, an arm-type support or a disk, at a distance to an axis aligned essentially perpendicularly with respect to the floor surface of the vehicle. A motor, advantageously an electric motor, whose rotational speed can easily be controlled, may drive the rotation element by way of transmissions. For example, in the area of the bearing of the rotation element, angle sensors may be provided to record the angular position of the rotation element and transmit it to an analyzing unit. The angle sensors are part of the position determining devices for the search probe. From the radial distance between the search probe and the rotating axis and the rotating position, the position of the search probe relative to the axis of rotation can be determined in polar coordinates. The position of the axis of rotation (or the position of another point which is fixed relative to the axis of rotation) can be determined, as described above, by means of other position sensors devices. As a result, the position of the search probe with respect to the search surface or the search area can be determined at any time. This information may be transmitted to the analyzing devices.

The search signals are transmitted from a rotating search probe to the analyzing devices, for example, by sliding contacts or the like, preferably in the area of the bearing of the rotation element. For the electric contacting and transmission of the search signals of the eddy current probe, rotation transmitters may be provided which operate without any contact, transmission of alternating voltage taking place over an air gap between ferrite-core electromagnets arranged coaxially with respect to one another. These are optimally adapted to the transmission of high-frequency alternating voltages and operate without any wear.

A surface-type eddy current probe may be provided with a signal analysis which varies along the probe surface, having at least two lobes which are arranged preferably symmetrically with respect to one another, and provide the eddy current probe with a pseudo dipole characteristic, as described above. Several pairs of lobes may be combined.

The above-mentioned eddy current probe preferably has at least one transmitting coil for generating a variable magnetic field and at least one receiver coil. The receiver coil is arranged in the area of the magnetic field and has a plurality of windings 28, 85, 155 (FIG. 2B) which form at least one pair of coils 100 with a plurality of successively connected pairs of individual conducting loops 300, 400 that are connected differentially with respect to one another and have an identical induced voltage in response to the magnetic field of the transmitting coil. The transmitting coil may be wound of wire which can be used without any problems, that is, essentially without heating up, particularly for currents of 1 A.

The arrangement of a transmitting coil which generates a strong magnetic field and which can be operated in a pulse mode, preferably in a two-frequency operation, and a receiver coil arrangement of the above-mentioned type, is ideally adapted to the search task. Thus, although the variable magnetic field of the transmitting coil induces voltages in the individual conducting loops, because of the differential connection of adjacent conducting loops (relative to the voltages induced by the magnetic field), each pair of conducting loops is voltage free as long as only the magnetic field of the transmitting coil operates in them. In this case, a differential connection of individual conducting loops wound in the same direction is equivalent to a series connection of individual conducting loops wound in the opposite direction.

By means of the differential connection of individual conducting loops, a buildup of high induced voltages in the receiver coil arrangement can be largely avoided even in the case of a strong and/or high-frequency and multiple-frequency magnetic field of the transmitting coil. Low induced potentials lead to minimal (or no) stray capacitive currents that, because of the reduction of the potentials (which is difficult to control), would otherwise increase the interference level and therefore reduce the sensitivity. As mentioned above, strong magnetic fields of the transmitting coil are desirable in order to induce eddy currents with detectable effects on the receiver coil arrangement even in small and/or poorly electrically conducting objects to be detected and/or in objects which are farther removed from the detector. High frequencies may be desirable, among other things, because of the magnitude of the induced voltages (which is proportional to the frequency) in turn, determines the intensity of the induced currents. These receiving coil arrangements with a constructively caused, low potential level are also particularly advantageous for the multifrequency operation.

Each pair of coils of the receiving coil arrangement can be mechanically completely uncoupled from the magnetic field of the transmitting coil so that the magnetic field of the transmitting coil induces no overall voltage in the pair of coils, and may also be offset and/or rotated with respect to one another. By offsetting and/or rotating the pairs of coils with respect to one another, it is possible to construct the eddy current probe, for example, as a laterally expanded field of many pairs of coils. Laterally large-surface search coil arrangements make it possible to search larger areas more quickly than search probes with single coil pairs. If coil pairs are also rotated with respect to one another, the preferred directions of the highest or minimal sensitivity (the separating planes) of the individual coil pairs can be combined in an appropriate manner. Thus, information concerning a detected object can be received simultaneously by several pairs of coils and transmitted for processing. By correlating the search signals received from a detected object, by several coil paris the position detection capacity for objects to be detected can be increased. Also, the identification of an object according to its size, orientation and the shape, can be improved.

The receiver coil pairs may differ in their dimensions as well as in the number of pairs of individual conducting loops, their shape and/or type and manner of their combination. Advantageously, however, the coil pairs of the receiver coil arrangement have identical construction, which may be desirable particularly for reasons of economical manufacturing and quality control. It is expedient for the individual conducting coils of a pair to comprise essentially identical surfaces, to be arranged mirror-symmetrically with respect to a coil pair mirror plane corresponding to the neutral separating plane, and to be arranged with this plane in a mirror plane of the magnetic field of the transmitting coil. Preferably, as shown in FIG. 2A, a pair of coils may have a shape which is symmetrical with respect to a surface-separating plane 500 (coil pair mirror plane), particularly the shape of a double D with the separating plane being in parallel to the back of the D. Since it is sufficient, for the mechanical uncoupling between the magnetic field of the transmitting coil and the coil pair, for the magnetic flux passing through the individual conducting loops combined in pairs to be essentially the same in each case, it may suffice that the demand for a mirror-symmetry of the magnetic field is met essentially in the area of the pairs of conducting loops or of the coil pairs.

Although, it is possible for the individual conducting loops of the receiver coil arrangement to take the form of wire windings, advantageously, the receiver coil arrangement is constructed as a printed circuit and has at least one carrier layer of an electrically insulating material to which the windings are applied in the form of conductor bands of strip conductors arranged next to one another and consisting of an electrically conductive material, particularly metal. The carrier layer may be coated on one and several sides, and throughplatings may be provided to connect the carrier layer sides. For spatially concentrated packing of as many strip conductors as possible, carrier layers having several strip conductors may be arranged above one another, separated by a suitable insulation (multilayer technique). The eddy current probe may also have at least one shield against electric fields which preferably may also be made by the printed circuit technique.

Advantageously, at least one additional receiver coil, and preferably an identical coil pair, may be arranged at a distance above and/or below the receiver coil arrangement, aligned therewith. Such a pair of (advantageously mechanically uncoupled) coils may be used to provide information concerning the distance between the receiver coil arrangement and the object to be detected. Because the intensity of the magnetic field of the transmitting coil as well as the magnetic field of the eddy currents induced in the object to be detected are highly dependent on the distance (approximately proportional to the cube of the distance), the difference in intensity between the signals generated by a coil pair in the surface of the receiver coil arrangement and by such an identical coil pair arranged above or below (at a closer or farther distance from the object to be detected) can be used to estimate the depth position of the object. By analyzing this information it is possible to discriminate certain objects. For example, small parts such as fragments, which are situated on the ground surface may be recognized and discriminated.

The system may also have leveling devices which maintain constant the distance between the search probe moved over the search surface, and the surface itself, particularly the earth surface. This may be especially advantageous in the case of difficult terrain. A second probe guiding device arranged on a first probe guiding device, such as a vehicle, may also be perpendicularly slidable and/or tiltable with respect thereto, with spacers provided to keep the distance approximately constant between the search probe or search surface and the surface of the search area. The spacers may be mechanical (for example, support wheels or the like), or contact sensors may be provided which transmit distance signals to control the leveling devices. A constancy between the search surface and the surface of the search area which is as extensive as possible may be desirable in order to particularly improve and render more reliable the depth localization of the objects to be detected.

In a preferred embodiment of the eddy current probe as shown in FIG. 3, only one transmitting coil 39 is provided, which has a transmitting coil mirror plane 38. The receiver coil pairs 33–37 are offset laterally relative to each other, with the coil pair mirror planes (separating planes) being aligned in the transmitting coil mirror plane 38. The transmitting coil 39 may, for example, be an elongated rectangle, with rounded edges. The coil pairs 33–37 may be arranged to succeed one another (preferably directly) in the longitudinal direction. Such an elongated eddy current probe arrangement transversely to its longitudinal axis, particularly approximately perpendicularly thereto, can search wide paths essentially without any gaps by moving it transversely approximately perpendicular to its longitudinal axis. Similarly, another embodiment of the invention (FIG. 4) also uses only one transmitting coil arrangement 41, which has several transmitting coil mirror planes 42–45 which pass through a central transmitting coil axis 46. The coil pairs 50–57 are arranged to be offset and/or rotated with respect to one another, with the coil pair mirror planes in the transmitting coil mirror planes 42–45. For example, a square transmitting coil 41 can be used, which has mirror planes extending along the diagonal lines 43, 45 and the median lines 42, 44. Coil pairs, which are arranged symmetrically with respect to these transmitting coil mirror planes, have torsion angles with respect to one another which correspond to a multiple of 45°. At the location of the central transmitting coil axis 46, several coil pairs 58a–58d may also be rotated with respect to one another about a common axis coinciding with the central transmitting coil axis. The transmitting coil may also be constructed as a different even-numbered polygon, (for example a hexagon, an octagon or a dodecagon), in which case the corresponding torsion angles of the coil pairs with respect to one another each are determined by the angles between the symmetry planes of the transmitting coil.

Advantageously, the transmitting coil may be circular, thus having an infinite number of mirror planes. Coil pairs which are arranged with their coil pair mirror plane in the radial direction of a circular transmitting coil are also mechanically uncoupled. In the case of a circular transmitting coil with a rotationally symmetrical magnetic field, arbitrary torsion angles are therefore possible between the coil pair mirror planes. Coil pairs which are aligned identically with respect to the rotation may also be offset in the radial direction.

A preferred embodiment of the invention has a circular transmitting coil, and coil pairs which are rotated with respect to one another about the coil axis. Particularly when the transmitting coil and the receiver coil arrangement are not coplanar, the coil pairs may project beyond the area of the transmitting coil. Advantageously, the transmitting coil comprises coil pairs which are rotated with respect to one another, and the coil pairs and the transmitting coils are arranged in a coplanar manner. For example, four coil pairs may be rotated with respect to one another by 45° respectively or three coil pairs may be rotated with respect to one another by 60° respectively, the rotation about identical angles being advantageous but not absolutely necessary. As a result of the rotation, the coil pairs each partially overlap. This results in a sectorial sensitivity of the receiver coil arrangement.

A circular transmitting coil 63 (FIG. 5) is preferred which has a single, particularly double-D-shaped coil pair 65 whose coil pair mirror plane 61, as a neutral separating plane, separates two coil sectors 301, 401 from one another. The eddy current probe 60 has a pseudo dipole characteristic with the described advantages.

A circular transmitting coil 64 (FIG. 6) may also be provided which has two coil pairs 66, 67 which are rotated by 90° with respect to each other about the coil axis 69, 70, and which are surrounded by the transmitting coil 64. This arrangement provides an "orthogonal probe" in which the coil pair mirror planes which stand perpendicularly on one another divide the circular surface into four segments. In this case, the coil pair mirror planes are preferred planes to the extent that an object which is situated symmetrically with respect to a coil pair mirror plane, or a small object which is situated exactly on this mirror plane, generates almost no signal in the corresponding coil pair. The position of an object can therefore be determined relative to the coil pair in the direction perpendicular to the coil pair mirror plane, in which case no exact information can be obtained concerning the position of the object in parallel to the mirror plane. The same localizing possibility exists also for the second coil pair rotated with respect to the first coil pair. Search coil arrangements of this type are therefore particularly suitable for the precise-point localizing of objects to be detected. Coil pairs may also be combined so that the overall characteristics have no insensitive directions (in the case of an individual coil pair along the coil pair mirror plane). Such a search coil has no "blind spot" or "blind line".

For the correlation of the search signals to specific locations in the search area, position sensors are provided, to determine the position of the search probe and/or the first and/or additional probe guiding devices. Advantageously these may include at least one satellite-supported coordinate determining system arranged for determining the position of the first probe guiding device. It is also possible, of course, to determine the position of the first probe guiding device in a different manner, such as optically by means of laser tracking, starting from points of known coordinates on the earth's surface, or by means of radar and the like. The position of the first probe guiding device may also be determined by combining a travelling path measuring device and a direction determining apparatus, such as a gyroscope or a compandor, starting from a location of known coordinates. When the absolute coordinates of the objects to be detected are of no interest or of no direct interest, the object coordinates can also be determined with respect to a point in or near the search area, and can reliably be found again. They may also be made visible by a marking. The coordinates of this point may optionally be known or be determined in a conventional manner by measuring.

Advantageously at least one eddy current probe with a pseudo dipole characteristic can be connected in a signal-transmitting manner with the signal analysis unit for magnetic field probe signals. This may facilitate the above-described recording which permits an identification of the objects to be detected. In particular, an analysis unit which has proven itself for magnetic field probes may also be used for eddy current probes. Furthermore, the analysis unit may have at least one conversion unit, such as an analog-todigital converter interacting with the position sensors which converts the search signals into storable signals. Conversion of the search signals into digitally storable and processable signals permits the adaptation of the whole signal receiving system to computer systems which are known per se and can be adapted to the special search and analysis tasks. These computer systems may have at least one storage medium, at least one computer unit and preferably at least one output unit. The output unit may have at least one temporary and/or permanent flat recording carrier with an imaging surface the corresponding to the search surface. This may, for example, be an object map which can be produced by a printer; however, the recording may also take place temporarily on a video screen. Temporary recording in this manner may facilitate particularly the processing of the search data by way of computers. Interactive systems, which are known per se, may be used, for example, to indicate and analyze separate portions of the search area. In this case, the objects may preferably be represented by, in particular, colored object symbols, such as figure eight shaped symbols, from which the position of the object in the search area, as well as its size, orientation, material or type of material and their depth in the search area may be recognizable.

Other objects, advantages and novel features of the present invention will become apparent from the following detailed description of the invention when considered in conjunction with the accompanying drawings.

BRIEF DESCRIPTION OF THE DRAWINGS

FIG. 3 shows an eddy current probe according to an embodiment of the invention;

FIG. 4 shows another embodiment of an eddy current probe according to the invention;

FIG. 5 shows a circular transmitting coil according to another embodiment of the invention; and FIG. 6 shows a circular transmitting coil according to another embodiment of the invention.

DETAILED DESCRIPTION OF THE DRAWING

Figure 1:
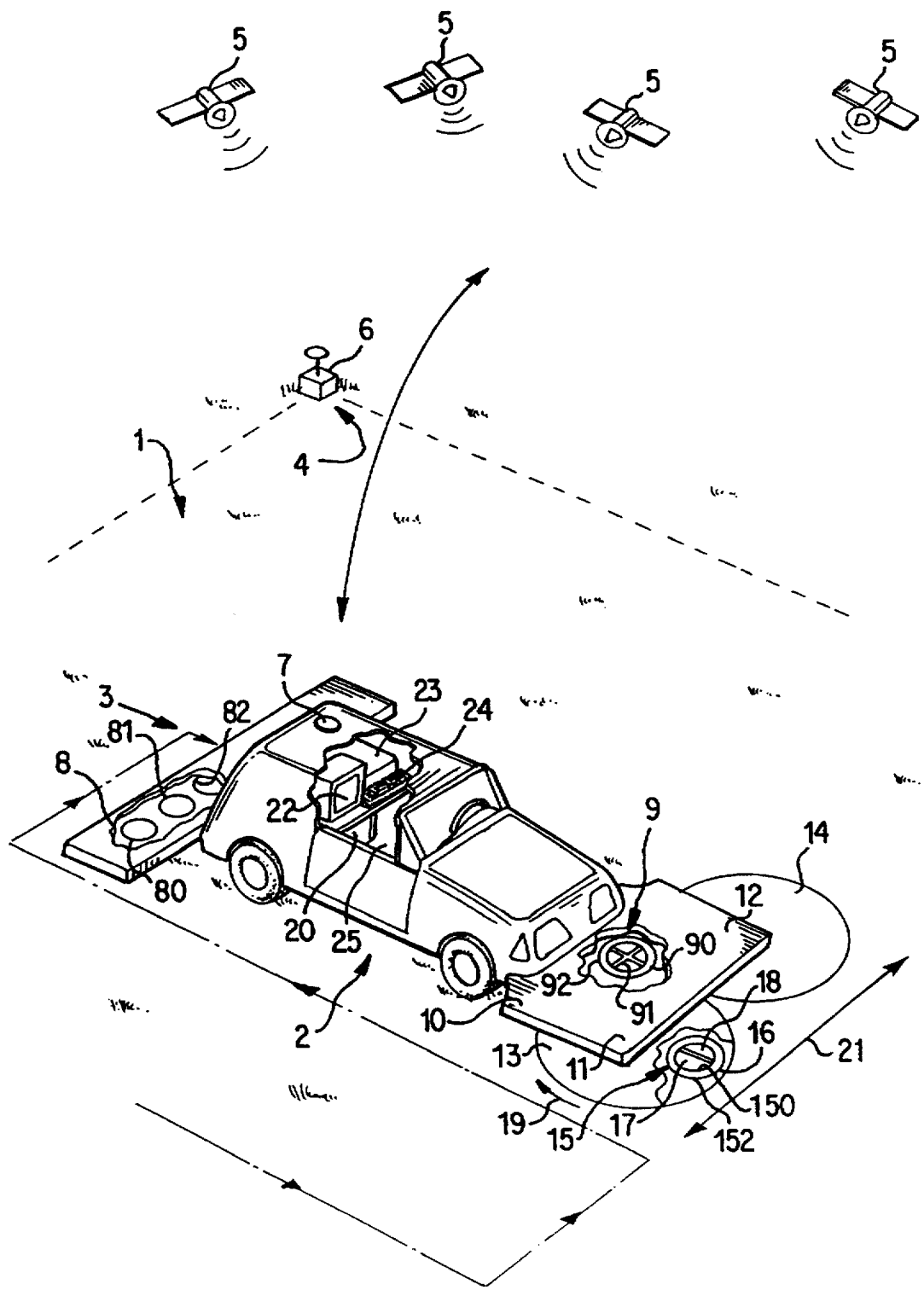
FIG. 1 is a schematic perspective view of a detection system according to the invention with satellite-supported position sensing devices.
Figure 2A:
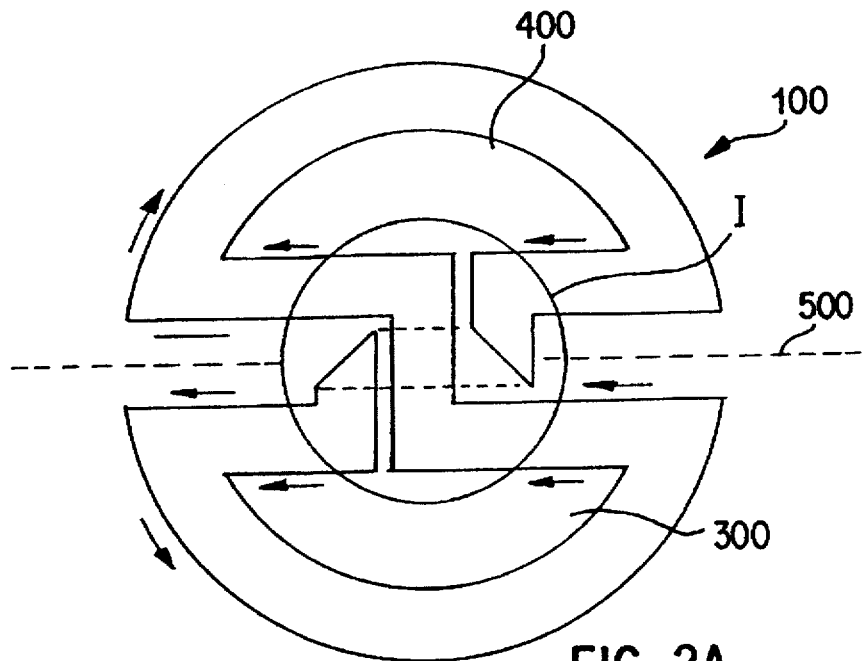
FIG. 2A is a schematic depiction of a receiver coil according to the invention.
Figure 2B:
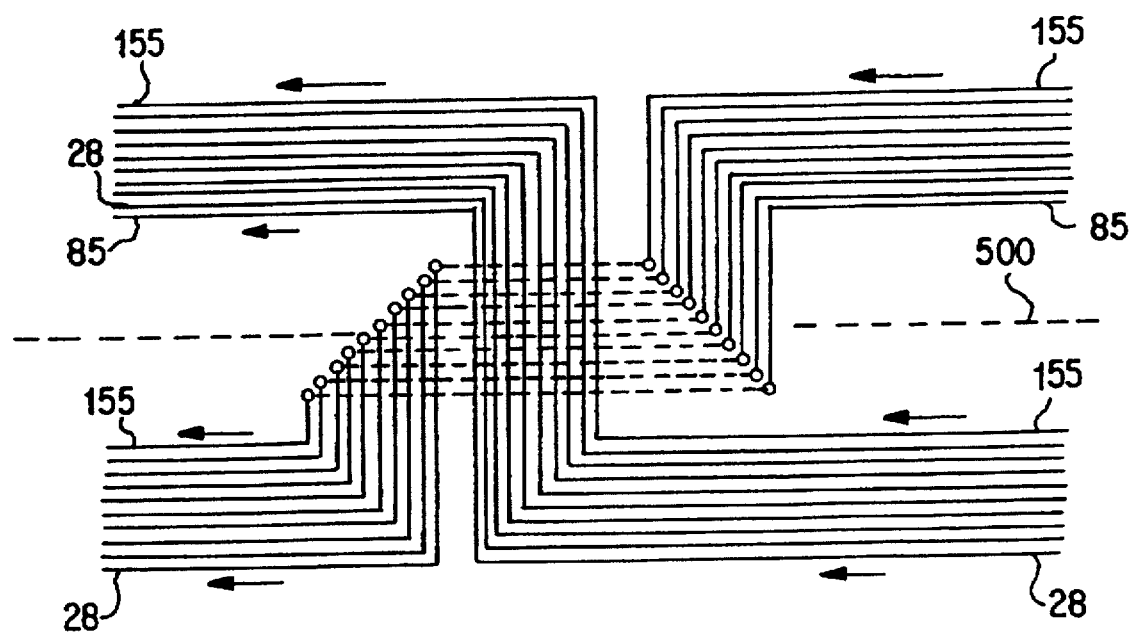
FIG. 2B is a detailed view of the portion of FIG. 2A which is enclosed by circle I.

Symbolized by broken lines, FIG. 1 shows a square corner portion of a search area 1 on the earth's surface. In the search area, a first probe guiding device 2 (for example, a land vehicle) is moved along a first direction 3. The position of the vehicle 2 in the search area 1 is determined by a differential GPS system 4 which is part of the localizing device of the detection system. The GPS receivers, specifically the stationary receiver 6 and the mobile receiver 7 arranged on the vehicle 2, which are in a signal-transmitting contact with the satellites 5, permit an exact determination of the position of the mobile receiver 7 relative to the stationary receiver 6, even if the absolute coordinates of the receivers 6, 7 are systematically offset from the true coordinates. If desired, the absolute coordinates of the stationary receiver 6 can be measured and used to determine the coordinates of the mobile receiver.

Starting from the position of the mobile receiver 7, by way of the alignment of the vehicle which can be determined by a compass (not shown), the position of each object rigidly arranged on the vehicle 2 can be calculated based on its distance from the mobile receiver 7. This applies to the magnetic field probes 80–82 which are arranged in a row next to one another in the transverse carrier 8 as well as to the orthogonal probe 9 which is fixedly installed in the forward carrying element 10 of the vehicle 2. Likewise, the positions of the axes of rotation 11, 12 of the right and left second probe guiding devices 13 and 14 (constructed as rotating disks), are also determined. In the illustrated example, each of the rotating disks 13, 14 has an eddy current probe, only the right eddy current probe 15 being shown for the sake of simplicity. This probe 15 has a double D shaped receiving coil pair 150 which provides the eddy current probe 15 with a sensitivity that varies symmetrically around the neutral separating plane extending parallel to the back of the D and perpendicular to the rotation plane of the disk 13.

The D-shaped probe sectors provide the eddy current probe 15 with a pseudo dipole characteristic. That is, when the probe is moved perpendicularly to the separating plane 16 over an object to be determined, the forward probe sector 17 (depending, of course on the direction of the movement) emits a signal first. This signal then decreases to nil when moving over the separating plane 16 over the object. The output signal reaches a second maximum (which can be differentiated from the first maximum) when the rear probe sector 18 is situated over the object to be detected. In this manner, an object generates a pseudo dipole signal when the eddy current probe 15 is guided over the object to be detected in the rotating direction 19 of the rotating disk 13. The described pseudo dipole effect naturally exists also when the objects to be detected are large in comparison to the dimension of the probe sectors 17, 18 because each location (close to the surface) of the object to be detected may be considered as a source of a magnetic field induced by eddy currents. Signals of an object to be detected may be combined to form an overall signal.

The position of the eddy current probe 15 relative to the right axis of rotation 11 is a function of the radius of rotation of the eddy current probe 15 and the angular position of the rotating disk 13. The rotating position is determined by angle sensors (not shown) which are arranged in the area of the axis of rotation 11. The left rotating disk 14 is identical to the right rotating disk 13 and, in the example shown, rotates synchronously with it. This arrangement facilitates the determination of the positions of the two rotating eddy current probes because their relative distance and the alignment remain constant.

In the area of the axis of rotation 11, 12 transformatory ferrite core rotation transmitters (not shown) are arranged which operate in a no-contact manner and which transmit the search signals of the rotating eddy current probe to the analysis unit 20. Rotation transmitters are also used to supply the transmitting coils 152 of the rotating eddy current probes which are round and in each case comprise the receiving coil double-D arrangement 150.

In principle, the orthogonal probe 9 (transmitting coil 92, coil pairs 90, 91) has a construction similar to that of the eddy current probe 15, but has two neutral separating planes which extend perpendicularly with respect to one another. As a result, the orthogonal probe has a four-sector behavior which permits precise point location of objects to be detected. When the vehicle 2 is moved in the direction 3, the orthogonal probe 9 analyzes the intermediate area between the areas scanned by the rotating probes. Each of the probes separately therefore moves on a search path whose width is determined by the diameter of the eddy current probe. All search paths are situated in a common search surface which extends essentially parallel to the surface of the search area 1. In the illustrated embodiment, when the vehicle 2 is moved in the direction 3, an overall path of the width 21 is searched without gaps by the eddy current probes arranged in the forward area of the vehicle as well as the magnetic field probes which are arranged in a comb-type manner in the rearward area of the vehicle in the transverse carrier 8 and which are not influenced by the eddy current probes.

The search signals of the search probes are combined in the analysis unit 20, converted into digitally processable data and stored in memory 25. By means of analysis hardware and software adapted particularly to the signals of the magnetic field probes, in the shown example, the stored data can be used on board the vehicle 2 to form an image of the objects to be detected in the search area by way of the video screen 22 and/or the printer 23. The image may be manipulated, for example, by selection of the type of indication (e.g., only ferrous metals) by way of the keyboard 24 or a mouse (not shown).

In another embodiment, the vehicle alone has the units required for the storing of the data, and the search surface is analyzed based on the stored data, in a time-staggered manner after the search operation. In another embodiment, the search signals are converted and transmitted, for example, by radio telemetry, to an analysis unit set up at the edge of the search surface, and may be analyzed there simultaneously with the search operation or afterwards.

By means of the described embodiments, a vehicle-supported and GPS-supported eddy current and magnetometer search system is provided for detecting the location and depth of metallic bodies close to the surface and at greater depth for the purpose of clearing and disposing of old waste.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for detecting electrically conducting objects in a laterally extending search area, said process comprising:
    guiding at least one search probe along a search path in proximity to a search surface within said search area;
    said search probe generating search signals indicative of electrically conducting objects located within said search path;
    determining position of said at least one search probe, and generating position signals indicative thereof; and
    automatically correlating said search signals with said position signals whereby position of electrically conducting objects may be determined within said search area;
    wherein said search path is defined by superimposing a first movement which is substantially linear with a second movement which is rotational along a continuous curved closed path.

2. A process according to claim 1 further comprising the steps of generating an image of electrically conducting objects within the search area based on correlated position signals and search signals.

3. A process according to claim 1 wherein said correlating step is performed by an analysis unit which is coupled to receive signals transmitted from said search probe.

4. A process according to claim 1 wherein:
    the search surface is substantially flat;
    the search area is probed by the search probe in a preferably flatly contiguous area, without any gaps; and
    search path sections adjoin one another in said search area and overlap one another at least partially.

5. A process according to claim 1 wherein said first movement follows a winding search path comprising straight line segments.

6. A process according to claim 1 wherein said first movement follows a winding search path comprising straight line segments.

7. A process according to claim 1 wherein the search probe is an eddy current probe which is excited by at least two frequencies of the exciter field, and has a signal analysis which varies along a probe surface, providing pseudo dipole characteristics.

8. A process according to claim 1 wherein the search probe is a magnetic field probe which detects changes of the earth's magnetic field caused by the effect of the earth's magnetic field on magnetizable objects.

9. A process according to claim 1 wherein at least one eddy current probe and at least one magnetic field probe are guided simultaneously along the search surface, the search signals of the eddy current probe and of the magnetic field probe being combinable to form a common image.

10. A process according to claim 1 wherein said step of determining position is performed by means of at least one of the following: optical sensors, mechanical sensors, electro-mechanical sensors and a satellite positioning device.

11. A process according to claim 2 wherein said step of generating an image takes place on a flat recording carrier which has an imaging surface corresponding to the search surface, an object being represented by a colored object symbol from which at least one of the position of the object in the search area, and its size, orientation, material type and depth, can be determined.

12. An apparatus for detecting electrically conducting objects in a laterally extending search area, comprising:
    at least one search probe which generates electrical search signals indicative of presence of an electrically conducting object in proximity thereto;
    a probe guiding arrangement on which said at least one search probe is mounted, for guiding said at least one search probe along a search path in proximity to a search surface in said search area;
    a position sensor arrangement for determining position of said at least one search probe on said search surface; and
    an analysis unit coupled to receive said search signals from said at least one search probe for automatically correlating said search signals with position of said at least one search probe determined by said position sensor arrangement;
    wherein said search path is defined by superimposing a first movement which is substantially linear with a second movement which is rotational along a continuous curved closed path.

13. A process according to claim 1 wherein said means for guiding moves said search probe substantially parallel to said search surface.

14. A process according to claim 1 wherein analysis unit is coupled to receive said search signals by radio transmission.

15. A process according to claim 1 wherein said analysis unit further comprises means for generating an image of objects in said search area based on said search signals.

16. An apparatus according to claim 12, wherein the probe guiding arrangement comprises at least a first probe guiding device which is movable along a substantially linear path parallel to the search surface, and at least a second probe guiding device which can be rotated through said continuous curved closed path, about an axis of rotation which is substantially perpendicular to the search surface, said at least one search probe being mounted on said second probe guiding device.

17. An apparatus according to claim 16 wherein the first probe guiding device is a remotely controllable vehicle.

18. An apparatus according to claim 17 wherein said vehicle is a land vehicle.

19. An apparatus according to claim 16 wherein rotation transmitters for alternating voltage are arranged between the search probe and the analysis unit, and operate in a no-contact manner.

20. An apparatus according to claim 12 wherein the search probe is an eddy current probe having a signal analysis that varies by sectors of a probe surface thereof, and having at least two probe sectors which arranged symmetrically with respect to one another.

21. An apparatus according to claim 20 wherein the eddy current probe has at least one transmitting coil for generating a variable magnetic field and at least one receiver coil arrangement situated in the area of the magnetic field and having a plurality of windings, the windings forming at least one coil pair which has a plurality of successively connected pairs of individual conducting loops which are connected differentially with respect to one another and are identical with respect to the voltages induced in them by the magnetic field of the transmitting coil.

22. An apparatus according to claim 21 wherein the individual conducting loops of a pair have essentially identical surfaces and are arranged mirror-symmetrically with respect to a coil pair mirror plane separating the surfaces and coinciding with a mirror plane of the magnetic field; and wherein the coil pair has a shape which is symmetrical with respect to the coil pair mirror plane.

23. An apparatus according to claim 22 wherein the coil pair has the shape of a double D with a coil pair mirror plane in parallel to the backs of the D.

24. An apparatus according to claim 21 wherein the transmitting coil is constructed as a flat coil wound with wire having a high current carrying capacity.

25. An apparatus according to claim 20 wherein the eddy current probe has a transmitting coil and a plurality coil pairs which are arranged offset and rotated with respect to one another, with coil pair mirror planes in mirror planes of the magnetic field of the transmitting coil.

26. An apparatus according to claim 21 further comprising a circular transmitting coil and two coil pairs which are rotated with respect to one another by 90° about a central, transmitting coil axis, which coil pairs, in particular, are surrounded by the transmitting coil.

27. An apparatus according to claim 12 wherein said position sensor arrangement comprises at least one satellite-supported coordinate determining system.

28. An apparatus according to claim 12 wherein the analysis unit has at least one signal analyzing unit for analyzing magnetic-field probe signals based on distortions of the earth's magnetic field caused by magnetizable objects, to determine shape and position of such magnetizable objects.

29. An apparatus according to claim 20 wherein at least one eddy current probe with a pseudo dipole characteristic is connected in a signal-transmitting manner with the signal analyzing unit for magnetic-field probe signals.

30. An apparatus according to claim 12 wherein the analysis unit has at least one conversion unit for converting search signals into storable signals, which conversion unit interacts with the position sensor, as well as at least one storage medium, at least one computer unit and preferably at least one output unit.

31. An apparatus according to claim 30 wherein the output unit has at least one flat recording carrier with an imaging surface corresponding to the search surface, in which an object can be represented by a colored object symbol from which at least one of the position of the object in the search area, and its size, orientation, type of material, and depth, can be determined.

32. A process according to claim 1 wherein said substantially linear, movement comprises a succession of substantially straight segments.

33. A process according to claim 1 wherein said continuous closed path comprises a circle.

34. A process for detecting electrically conducting objects in a laterally extending search area, said process comprising:

guiding at least one search probe along a search path in proximity to a search surface within said search area;

said search probe generating search signals indicative of electrically conducting objects located within said search path;

determining position of said at least one search probe, and generating position signals indicative thereof; and automatically correlating said search signals with said position signals whereby position of electrically conducting objects may be determined within said search area;

wherein said search path is defined by superimposing a substantially linear motion with a unidirectional rotation about a point or points which move with said substantially linear motion.

\* \* \* \* \*